United States Patent [19]

Imanaka et al.

[11] Patent Number: 4,763,261
[45] Date of Patent: Aug. 9, 1988

[54] WHEEL-SPEED DETECTING ARRANGEMENT

[75] Inventors: Asaji Imanaka; Tatsuo Fujiwara, both of Kobe; Shuichi Osaka, Osaka, all of Japan

[73] Assignee: Nippon Air Brake Co., Ltd., Kobe, Japan

[21] Appl. No.: 855,049

[22] Filed: Apr. 23, 1986

[30] Foreign Application Priority Data

Apr. 23, 1985 [JP] Japan .................. 60-88346

[51] Int. Cl.$^4$ ............................................. G01P 3/481
[52] U.S. Cl. .................................. 364/426; 324/160; 377/20; 364/565
[58] Field of Search ............... 364/426, 565, 561, 566; 324/160, 161, 162; 303/95, 94; 377/20

[56] References Cited

U.S. PATENT DOCUMENTS

| 3,892,952 | 7/1975 | Shibata et al. | 303/95 X |
| 4,072,364 | 2/1978 | Gudat et al. | 303/95 |
| 4,177,516 | 12/1979 | Mason | 364/431 |
| 4,179,656 | 12/1979 | Wagner | 364/565 |
| 4,434,470 | 2/1984 | Thomas et al. | 364/565 |
| 4,485,452 | 11/1984 | Cording et al. | 364/565 |
| 4,581,713 | 4/1986 | Fennel | 364/565 |
| 4,648,104 | 3/1987 | Yachida et al. | 377/54 |

Primary Examiner—Parshotam S. Lall
Assistant Examiner—Thomas G. Black
Attorney, Agent, or Firm—G. E. Hawranko

[57] ABSTRACT

A wheel-speed detecting arrangement for detecting the wheel-speed of a vehicle having a fixed wheel-and-axle configuration includes a wheel generator connected to the wheel/axle configuration such that a first distance signal is produced indicating rotational displacement of the wheel. This first distance signal is then synchronized by use of a basic clock and passed onto a first counter which produces a first data signal indicative of the number of distance pulses. A second counter, enabled as a function of the output of the first counter, measures the number of clock pulses occurring within a measuring time period and generates a second data signal representing that time count. The first distance signal also operates a latch circuit such that, upon initial occurrence of any distance pulse, a reading of the second counter is taken and passed through to a calculating circuit. The calculating circuit uses this latched second data output and the first data signal to calculate the wheel-speed according to the relationship $V = k \cdot (n-1) t$, where V is the wheel-speed, k is a proportionality constant, n is the first data signal, and t is the second data signal.

10 Claims, 3 Drawing Sheets

WHEEL-SPEED DETECTING ARRANGEMENT

BACKGROUND OF THE INVENTION

This invention relates to an arrangement and method for detecting wheel speed, especially for vehicles having a fixed wheel-and-axle configuration, as does a train. Such detection of wheel-speed is critical in detecting an undesirable wheel-skid condition; that is, where the train continues to move after the wheels have been locked during a braking operation. To date, wheel-speed detecting arrangements have utilized an electric motor or generator device on the car wheel, which would output a signal representing the rotational characteristics of the wheel. These rotational characteristics were then utilized in one of two manners to determine the vehicle speed. In one known technique, the time is measured until a specific integer number is attained, which specific integer number corresponds to a predetermined distance value. Knowing the specific distance travelled in the measured time, it is only necessary to perform a basic mathematical operation to determine the vehicle velocity. The disadvantage to such a technique, however, is that the precision over the wide range of velocities attainable by a train is sacrificed. Such a distance-based method exhibits high precision over the measured time at high velocities, if the sample value N at which the time is measured is also high and, further, exhibits high precision over the measured time at low velocities if the sample value N is low. However, the sample value N, or number of distance pulses attained at which the measured time t is taken, must remain constant for that given application; that application being a vehicle wherein high and low velocities each occur at similar frequencies. Under such a restriction, at whichever limit of values the sample value N is selected, will result in a low precision of velocity determination for either the low-velocity or high-velocity situation. In other words, in order for the measured time parameter t to be proportional to the velocity, regardless of the selected sample value N, the time t and therefore the detected velocity, require a differential factor along with the time required to solve the vehicle velocity, which differential factor will vary with the velocity, thereby making it virtually impossible to obtain the vehicle velocity in a set period of time.

In a second known technique for determining vehicle velocity, using a distance pulse output of a wheel generator, a set time period T is established and the number of distance pulses occurring in this time period T is used to calculate vehicle velocity. This technique is known as a time-based velocity measuring technique and suffers similar deficiencies with respect to precision as does the distance-based technique. The precision in this second technique is limited by the situation that the count in distance pulses n can be read only in integers, making it necessary to discard the excess when one pulse is not completed in conjunction with the expiration of the set time period T. Errors are thereby created and in the particular case of low-velocity situations, the number of distance pulses n within limiting time period T is small, making the effect of discarding of any excess values rather large. If it is desired to raise the precision of the velocity determination at low velocities by lengthening the limiting time T, fine velocity changes occurring within this lengthened set time period T, go undetected.

SUMMARY OF THE INVENTION

It is therefore an object of the invention to provide a method of detecting wheel-speed which produces a precise vehicle velocity determination at high and low-velocity ranges.

It is a further object of the invention to provide such a wheel-speed detecting method which provides a precise vehicle velocity determination, regardless of the range of possible values of the parameters used in the velocity equation.

It is an even further object of the invention to provide such a wheel-speed detecting method which utilizes characteristics of both a time-based and a distance-based formula to determine a precise vehicle velocity determination.

An even further object of the invention is to provide such a wheel-speed detecting method wherein the characteristics of a time-based measurement technique are utilized to inhibit the negative characteristics of a distance-based measurement technique.

Briefly, the invention consists of a wheel generator secured to a fixed axle/wheel arrangement, and operable such that distance pulses are output therefrom as a function of the rotated distance of the wheel/axle arrangement. A basic clock triggers a synchronizing circuit so that the distance pulse coincides synchronously with the overall circuit. A distance pulse output n then triggers a flip-flop element which, in turn, enables a gate circuit, also operated by the basic clock. The gate circuit output then goes to enable a time-counter element, which outputs a time-count t through a latch circuit which is enabled by the distance-count output n. A clear signal generator, also operated by the basic clock, establishes a limiting time period T in which a sample of distance pulses n are taken. In order to determine the vehicle velocity with the limiting time period T set and the number of distance pulses n present in the limiting time T counted, while at the same time, the time-count t is being counted from an initial distance pulse N1 to a final distance pulse N2, the relationship $V = k \cdot (n-1) t$ is thereafter used where k is a constant used to correlate the results into a distance measurement.

DESCRIPTION AND OPERATION

Figure 1:
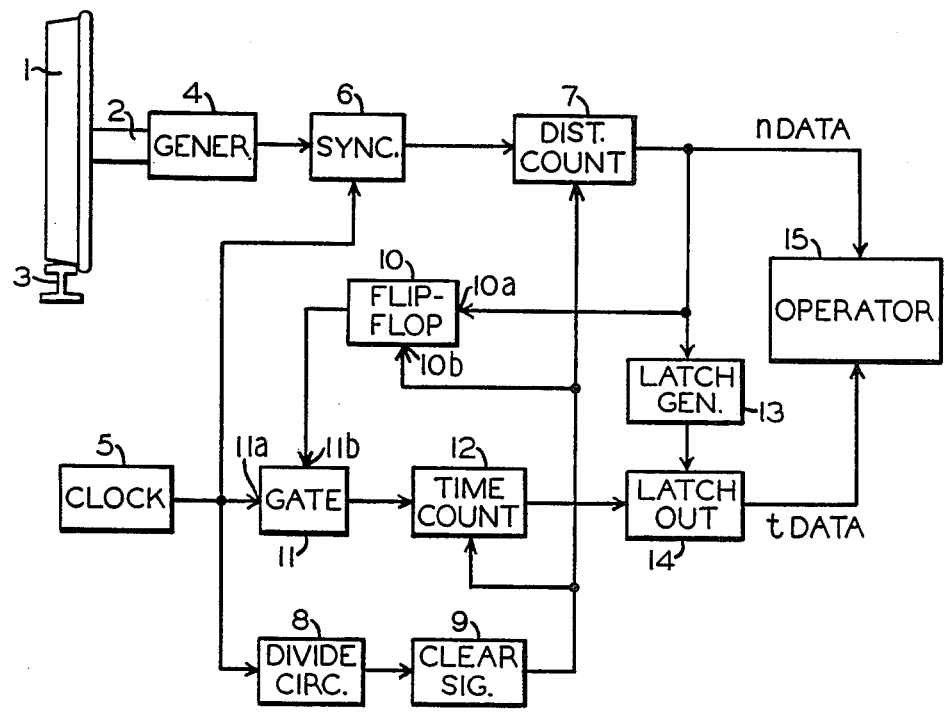
FIG. 1 is a representational view, in functional block diagram form, of a wheel-speed detecting arrangement constructed in accordance with the invention.
Figure 2:
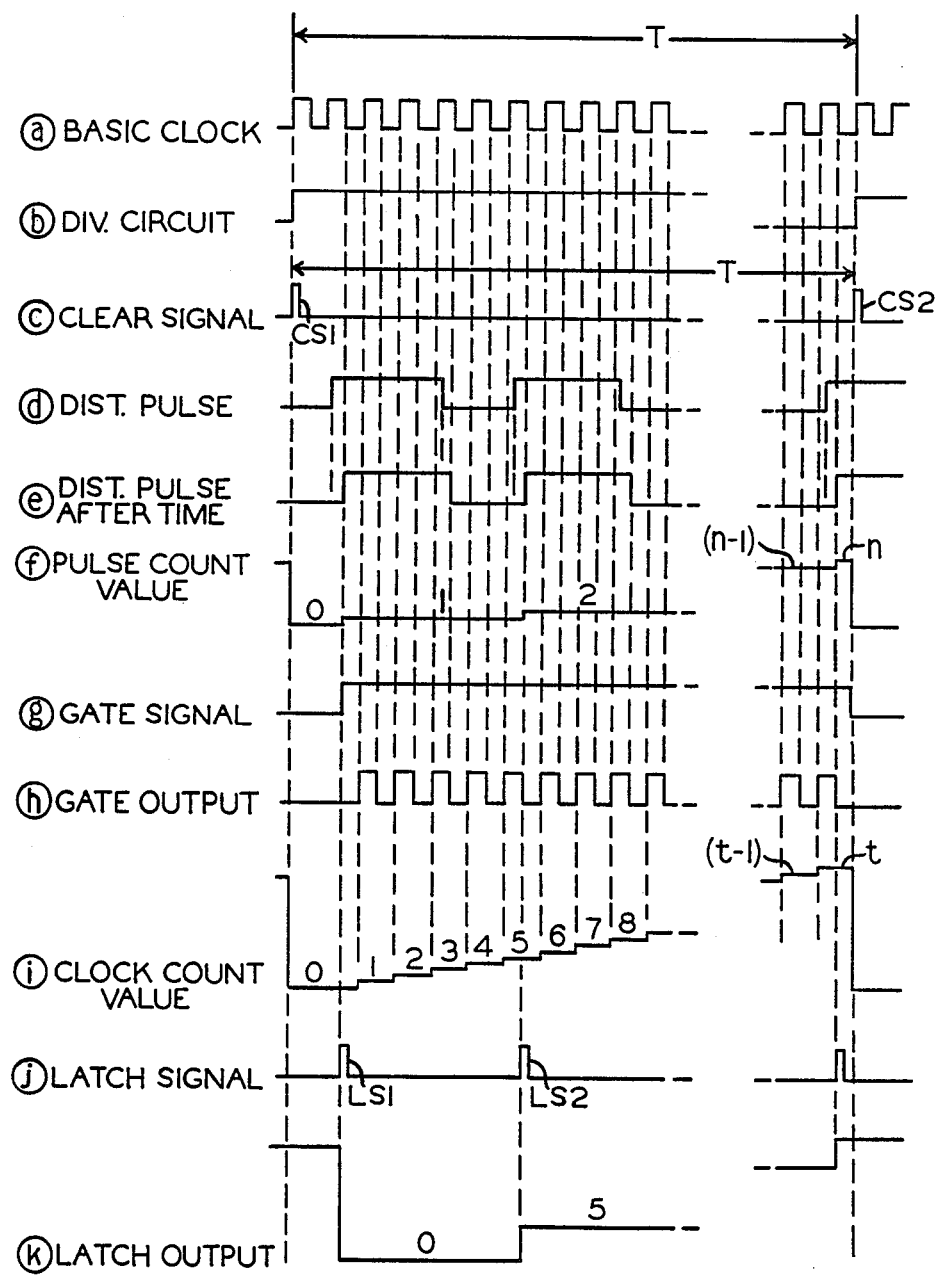
FIG. 2 is a graphical representation of the timing characteristics of the wheel-speed detecting arrangement of FIG. 1.
Figure 3:
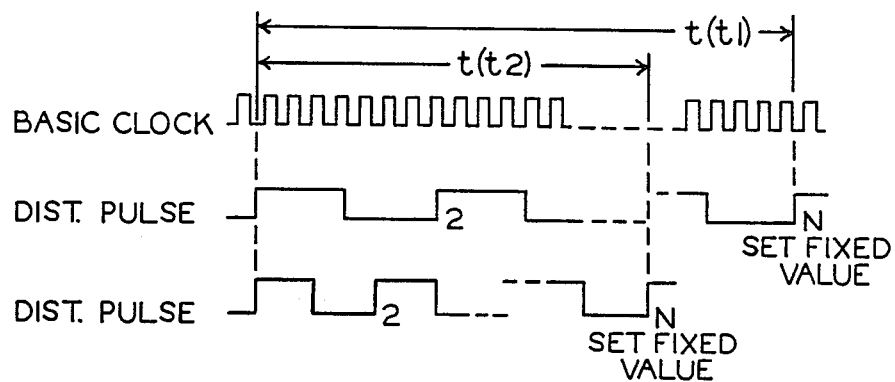
FIG. 3 is a graphical representation of the timing characteristics of a wheel-speed detecting method known in the art.

The wheel-speed detecting arrangement, shown in FIG. 1, works specifically on vehicles having a fixed wheel 1 and axle 2 configuration such as, for instance, a railroad vehicle which travels over rails as shown by reference 3 in FIG. 1. On such a railroad application, detection of wheel-speed is essential in detecting and correcting for a wheel-lock situation, which detecting and correcting operation is typically identified as an anti-lock braking system. The typical wheel-speed detecting arrangement utilizes a wheel rotational displacement generator 4 mounted in the rotatable axle 2 such that, the rotational displacement of the wheel 1 and axle 2 can be measured and output in the form of a distance pulse, which distance pulse is illustrated in FIG. 2 at line d. A basic clock device 5 is provided so that the proper timing sequences of the various operating elements can be synchronized, which operating elements and timing sequences will be described hereinafter in further detail. This basic clock device 5 can be provided in the form of a crystal oscillator, or any other known technique wherein a continuously-accurate clock pulse can be achieved.

A synchronizing circuit 6 receives the distance pulse output from the wheel generator 4 and conditions the distance pulse signal, in conjunction with a basic clock input, to the synchronizing circuit 6 from the basic clock 5, to produce a synchronized distance pulse which is illustrated in FIG. 2 as line e. The synchronized distance pulse, after being output from the synchronizing circuit 6 in the form of a series of equal-magnitude pulses, is communicated to a distance count circuit 7 which receives this series of distance pulses and increments a counter upon each pulse occurrence such that, the output of the distance counter circuit 7 is the cumulative output of the number of synchronized distance pulses, which output is shown at line f of FIG. 2. The distance pulse count, shown as n data in FIG. 1 and illustrated at line f of FIG. 2, will be utilized in determining the wheel-speed, as will be explained hereinafter in further detail.

Figure 4:
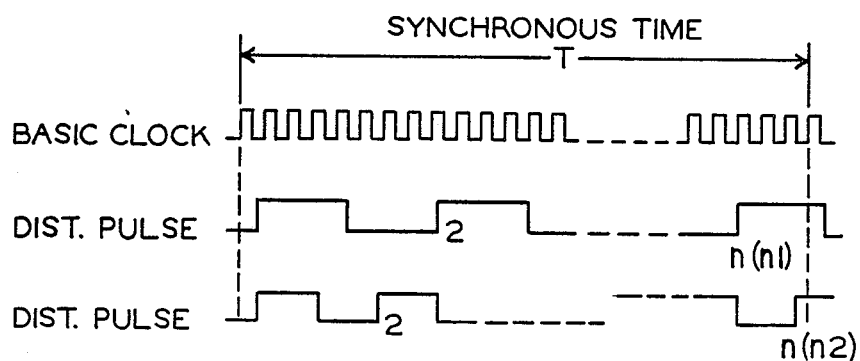
FIG. 4 is a graphical representation of the timing characteristics of a second wheel-speed detecting method known in the art.

The basic clock device 5 additionally transmits the clock pulses, shown at line a of FIG. 2, to a divide circuit 8 which has the function of stepping-down the number of clock pulses in accordance with a preselected limiting time period T; that is, the divide circuit 8 divides the number of clock pulses to arrive at a less-frequent factor, the limiting time period T. This limiting time period T can be adjusted over a range of values and is effective such that, during the limiting time period T, a measurement of the number of distance pulse counts n is taken for use in the determination of the vehicle velocity. The limiting time period T will not be a factor in the equation for determining the vehicle velocity and, therefore, the selected value for the limiting time period need only be of sufficient length to ensure a reasonable number of distance pulses have occurred; the selection need not be made with regard to occurring at the end, as opposed to the middle, of a distance pulse n. In one known technique for determining wheel speed, the time period T is a factor. As shown in FIG. 4, the time period T must be selected so as not to eliminate critical distance pulses; however, such cannot be done where a range of high and low velocities occur.

The output of the divide circuit 8 is then fed to a clear signal circuit 9 which, upon expiration of the limiting time period T, outputs a clear signal pulse as shown at line c of FIG. 2. The clear signal pulse is then transmitted to various other circuit elements, including the distance counter circuit 7, to terminate the counting operation of that circuit.

The clear signal circuit 9 detects a pulse rise and fall of the divide circuit 8 output, shown at line b of FIG. 2, and outputs the clear signal upon sensing the rising portion of the divide circuit pulse; therefore, the time from a given clear signal pulse to the next clear signal pulse is the limiting time period T.

A flip-flop device 10 has communicated, to a first input 10a, the distance count n output of the distance counter circuit 7. However, the flip-flop device 10 is set, that is, enabled such that an output pulse changes upon communication of the clear signal to a second input 10b.

The output of the flip-flop device 10 is then coupled to a gate circuit 11. The gate circuit 11 receives the basic clock pulse at a first gate input 11a, but only provides a gate output when enabled by the output of the flip-flop device 10 being communicated to a second gate input 11b. As seen at line g of FIG. 2, the gate signal which enables the gate circuit 11 is, in fact, the output of the flip-flop device 10, and is seen rising in conjunction with the rise of the first distance count output n following occurrence of the first clear signal pulse, and falling upon occurrence of the second clear signal pulse. In this manner, it can be appreciated that the gate signal is high only when the distance count output n is occurring within the limiting time period T and, therefore, the gate output which is shown at line h of FIG. 2 and which follows the timing pulse characteristics of the basic clock 5, is present at this time as well.

The gate output signal is then communicated to a time counter circuit 12. Similar to the distance counter circuit 7, the time counter circuit 12 receives the basic clock pulses and increments a counter to the next integer upon occurrence of successive clock pulses. The output of the time counter circuit 12, therefore, is the cumulative total of clock pulses occurring from the initiation of the clock count; that is, the gate signal going high to the completion of the clock count, which is upon occurrence of the clear signal, and will be designated hereinafter as time count t. The time counter circuit 12 receives a clear signal from the clear signal circuit g in the same manner as the distance counter circuit 7, and the flip-flop device 10 receives the clear signal.

The distance count output n is additionally communicated to a latch signal generator 13, which outputs a latch signal illustrated at line j of FIG. 2, each time the distance counter circuit 7 outputs a distance count value. It will be noted that the latch signal rises upon the distance count value going high, but it is a relatively short duration. Since the frequency of distance count values occurring is a function of the wheel velocity, the latch signal must go low before another distance count output can occur. The latch signal generator 13 communicates the latch signal to a first latch input 14a of a latch circuit 14. The latch circuit 14 also has a second latch input 14b which has communicated thereto, the time count t output from the time counter circuit 12. The latch circuit 14 is effective when enabled by the latch signal being input thereto, for latching or clamping onto the time count t at that particular time, so that the time count t can be correlated to the distance count n for purposes of determining the vehicle velocity, as will be hereinafter described. The latch output, therefore, is the value of the time count t output from the time counter circuit 12, taken only upon occurrence of the distance count value n as shown at line k of FIG. 2.

In operation, the wheel-speed detecting arrangement will be described in relation to the timing characteristics shown in FIG. 2. At the initial phase of the limiting time period T, a first clear signal CS1 is output from the clear signal circuit g and is effective to clear the count values on the distance counter circuit 7, the time counter circuit 12 and, as well, to reset the flip-flop device 10.

With the flip-flop device 10 so reset, the gate circuit 11 is disabled and the basic clock pulse is prevented from being communicated to the timer counter circuit 12. The latch circuit 14 is also disabled due to the time count t being interrupted.

At this time, the distance pulse output from the wheel generator 4 is communicated to the synchronizing circuit 6 which, by way of the basic clock pulse input thereto as well, conditions the distance pulse into a synchronized distance pulse. This synchronized distance pulse, following the occurrence of the clear signal, then initiates a new count sequence within the distance counter circuit 7, such new distance count n being represented at line f of FIG. 2.

The distance count output n also acts as an input to the flip-flop device 10 which, following communication of the enabling clear signal to the second input 10b, sets a high output from the flip-flop device 10, which is represented as the gate signal shown at line g of FIG. 2. The gate signal enables the basic clock pulse presented to a first gate input 11a of the gate circuit 11, to be communicated to the time counter circuit 12, which sequentially counts the number of clock pulses occurring when the gate signal is high.

Each time the distance count output n is counted by the distance counter circuit 7, the latch signal is output from the latch signal generator 13. The latch circuit 14, upon receiving the latch signal, samples or takes the time count output t of the time counter circuit 12 and places this value in a position to be used in calculating the vehicle velocity. As an example, upon the occurrence of a second latch signal LS2, shown at line j of FIG. 2, a time count value of 5 is present and shown as the value of the latch output shown at line k of FIG. 2. As a result, the distance count output n at the end of the limiting time period T, establishes a latch signal which operates to latch the time count output t.

This number of distance pulse counts n within the limiting time period T, and the time count output t occurring at the final distance count output n, are utilized within an operator circuit which calculates the wheel velocity by use of a formula $V = k \cdot (n-1) t$ where k is a proportionality constant.

It can therefore be appreciated that the limiting time period T in which the distance count n is calculated, and a distance limiting factor N in which the time count t is measured, are both factored out of the formula resulting in a velocity value which is a factor of two measured values, which values are interrelated in occurrence by means of a latch circuit 14.

It will further be noted that the clear signal CS and the latch signal LS are generated so as to be out of sequence to each other; that is, the timing is established so that there is a time-slack between the two signals.

Although the above discussion presents a preferred embodiment of the invention, it can be appreciated that modifications can be made thereto without departing from the scope of the invention. As an example, the time count t need not be the parameter that is latched, the distance count value n can be latched by the occurrence of time pulses.

We claim:

1. A wheel-speed detecting method for detecting the speed of a fixed wheel-and-axle configuration, said wheel-speed detecting method comprising:
    (a) measuring the rotational displacement of the fixed wheel-and-axle configuration, and outputting a first count signal representing said measured displacement value;
    (b) synchronizing such first count signal in conjunction with a clock pulse signal;
    (c) generating a clear signal upon completion of a preselected number of clock pulses, the time between two consecutive clear signals representing the time period within which said rotational displacement is detected;
    (d) counting the first count signals that occur within any two consecutive clear signal occurrences, and outputting a first data signal representing a cumulative total of said first count signals;
    (e) generating a first enabling signal as a function of said first data signal;
    (f) counting the clock pulses that occur following occurrence of said first enabling signal, and outputting a second data signal representing a cumulative total of said clock pulse signals;
    (g) latching said second data signal upon occurrence of any of said first count signals, and communicating such second data signal only in conjunction with an occurrence of said first count signal; and
    (h) calculating said rotational displacement by use of said first data signal and said latched second data signal in the relationship $V = k \cdot (n-1) t$ where V is said rotational displacement, k is a constant of proportionality, n is said first data signal, and t is said latched second data signal.

2. A wheel-speed detecting method, as set forth in claim 1, wherein said step of generating said first enabling signal is accomplished by setting a flip-flop circuit by use of a first-occurring pulse of said first count signal following said step of generating said clear signal.

3. A wheel-speed detecting method, as set forth in claim 2, further comprising, gating said first enabling signal with said clock pulse signal, and communicating said enabled clock pulse signal to a counter circuit for said second counting step.

4. A wheel-speed detecting apparatus for detecting the speed of a fixed wheel-and-axle configuration, said wheel-speed detecting arrangement comprising:
    (a) a wheel generator coupled to the fixed wheel-and-axle configuration such that a first count signal is generated as a function of the rotational displacement of the fixed wheel-and-axle configuration;
    (b) a clock circuit having a clock pulse signal output;
    (c) synchronizing means for receiving said first count signal and said clock pulse signal for conditioning said first count signal to a timing condition synchronous with said clock pulse signal;
    (d) a clear signal generator for receiving said clock pulse signals upon completion of a preselected number of said clock pulse signals, a clear signal is generated to establish a measuring time period in which said wheel-speed is detected;
    (e) a first counter circuit for receiving conditioned first count signal as a number of said conditioned first count signals occur during said measuring time period, a first data signal is generated which is a cumulative measure of said number of conditioned first count signals;
    (f) a second counter circuit enabled following occurrence of said clear signal and for receiving said clock pulse signals as a number of said clock pulse signals occur, a second data signal is generated which is a cumulative measure of said clock pulse signals;

(g) latching means for receiving at least one of said first and second data signals for latching one of said first and second data signals and communicating said one of said first and second data signals therethrough upon being enabled by the other of said first and second data signals; and (h) calculating means for receiving said one and such other of said first and second data signals for calculating said wheel-speed as a function of the relationship $V = k \cdot (n-1) t$, where n is said wheel-speed, k is a constant of proportionality, n is said first data signal, and t is said second data signal.

5. A wheel-speed detecting apparatus, as set forth in claim 4, wherein said one of said first and second data signals latched by said latching means is said second data signal and, further, whereing said first data signal enables said latching means such that said first data signal can be communicated to said calculating means.

6. A wheel-speed detecting apparatus, as set forth in claim 5, further comprising a flip-flop element for receiving said first data signal in the presence of a first positive-going output from said first counter circuit following occurrence of said clear signal, a first enabling signal is generated which is thereafter effective to enable said second counter circuit.

7. A wheel-speed detecting apparatus, as set forth in claim 6, further comprising a gate circuit for receiving said first enabling signal and said clock pulse signal so that said clock pulse signal is communicated therethrough only when said first enabling signal is present.

8. A wheel-speed detecting apparatus, as set forth in claim 6, wherein said clear signal is communicated to said first and second counter circuits and said flip-flop element simultaneously.

9. A wheel-speed detecting apparatus, as set forth in claim 5, wherein said latching means includes a latch circuit in communication with said first counter circuit and a latch generator in communication with said latch circuit, said latch circuit generates a latching signal upon recognition of any positive-going values of such first count signal, said latch signal in turn being communicated to said latch generator to enable said latch generator such that, upon occurrence of any of said latch signals, said latch generator latches onto a present count value output of said second count circuit.

10. A wheel-speed detecting apparatus, as set forth in claim 9, wherein said latch signal is substantially less in time-length than said first count signal.

* * * * *

UNITED STATES PATENT AND TRADEMARK OFFICE
CERTIFICATE OF CORRECTION

PATENT NO. : 4,763,261
DATED : August 9, 1988
INVENTOR(S) : Asaji Imanaka, Tatsuo Fujiwara & Shuichi Osaka It is certified that error appears in the above–identified patent and that said Letters Patent is hereby corrected as shown below:

Column 7, line 18, delete "whereing" and insert --wherein--

Signed and Sealed this

Ninth Day of May, 1989

Attest:

DONALD J. QUIGG

Attesting Officer

Commissioner of Patents and Trademarks